United States Patent Office 3,533,291
Patented Oct. 13, 1970

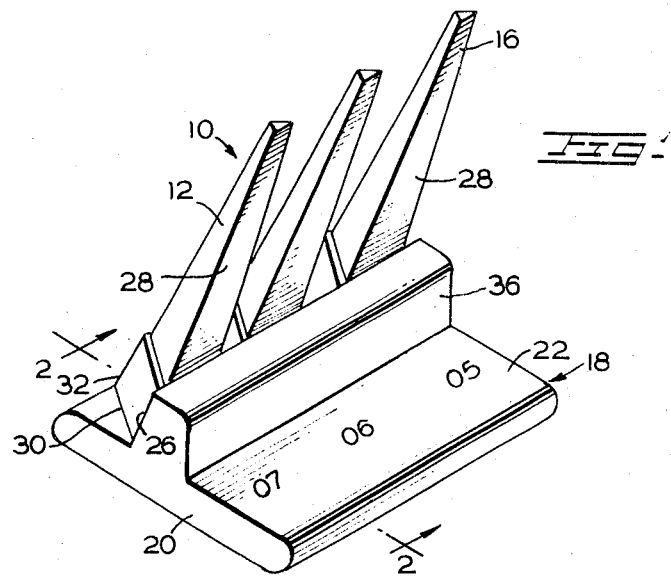
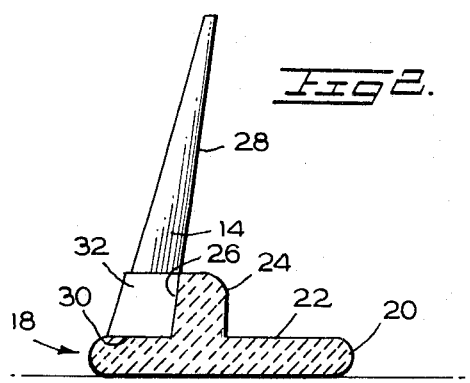
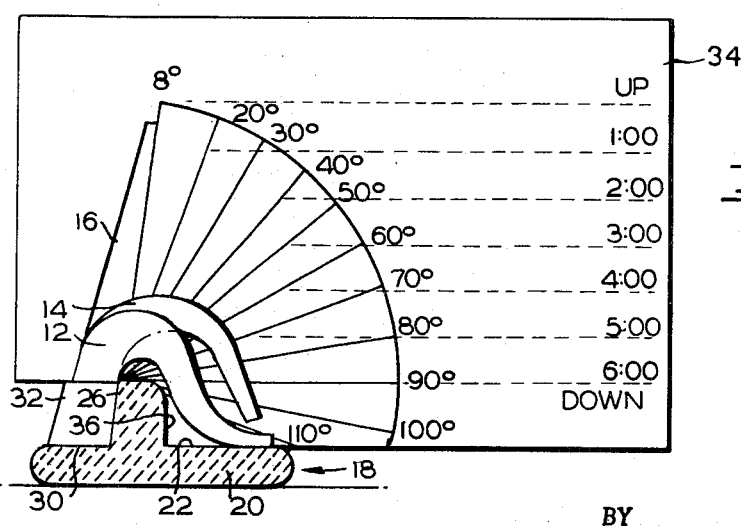

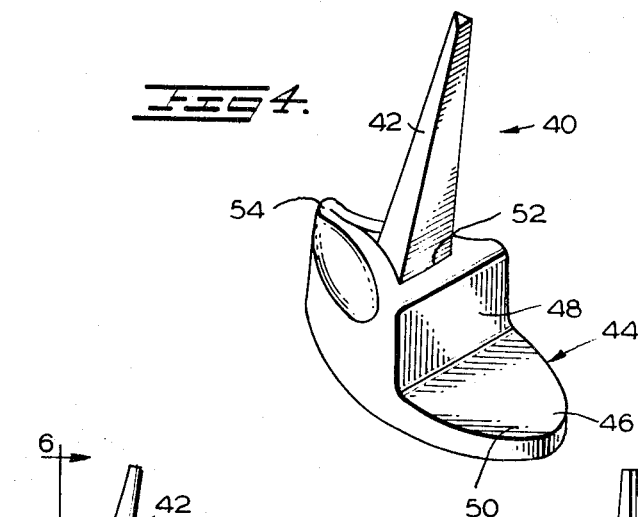
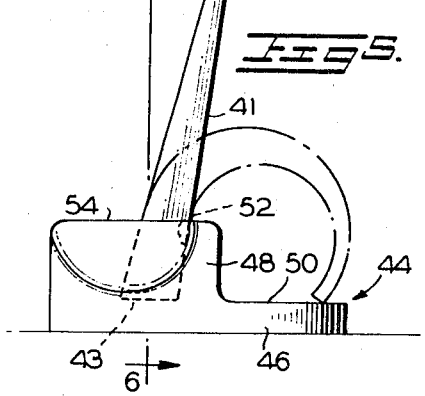
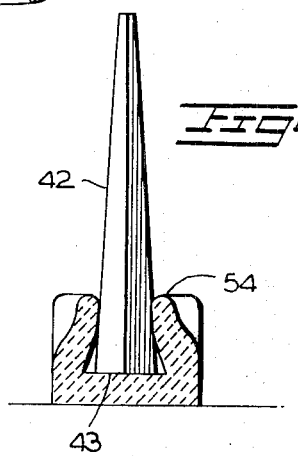
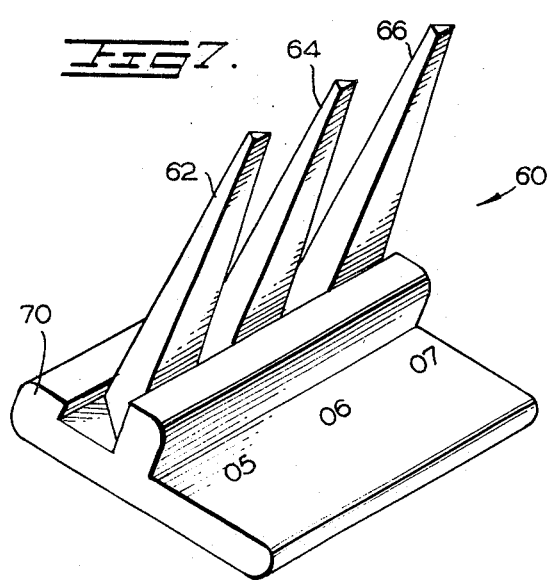
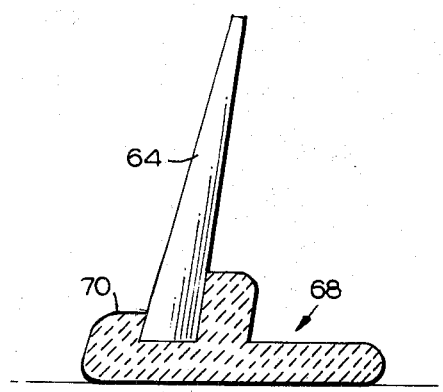
INVENTOR
RICHARD E. STEELE
MILAN VUKOVICH, JR.
ATTORNEYS

3,533,291
HEAT TREATMENT MEASURING SYSTEM
Richard E. Steele, Columbus, and Milan Vukovich, Jr., Galena, Ohio, assignors to The Edward Orton, Jr., Ceramic Foundation, Columbus, Ohio, a testamentary trust
Filed Sept. 9, 1968, Ser. No. 758,346
Int. Cl. G01k 11/08
U.S. Cl. 73—358       8 Claims

ABSTRACT OF THE DISCLOSURE

A heat treatment measuring system having a pyrometric cone and a holder for the cone. The holder has a horizontal base, a retaining wall which is almost vertical, and an adhesive device to support the lower portion of the cone against the retaining wall. As the cone is heated and fuses the upper portion bends downwardly over the retaining wall. An indicating gauge is provided and is adapted to be placed on the holder to show the amount of bending of the cone.

BACKGROUND OF THE INVENTION

Field of the invention

This invention relates to a system for measuring the amount of heat applied to one or more articles during a heat treatment process, such as the firing of ceramics in a kiln, which system includes a fusible indicator. More specifically, the invention concerns a heat treatment measuring system which includes at least one pyrometric cone and means for positioning such cone in a predetermined attitude.

Description of the prior art

The use of pyrometric cones for measuring the amount of heat applied to ceramic wares during firing is well known. Such cones are composed of mixtures of selected ceramic minerals and generally are formed in the shape of truncated, trigonal pyramids. When a cone of a particular composition is subjected to a predetermined amount of heating, the cone will gradually fuse and deform. The compositions of the cones are selected so that cones of different compositions will deform upon being subjected to different predetermined amounts of heating. Thus, cones of different compositions preferably are used together to permit an accurate determination to be made of the maximum amount of heat applied during a heat treatment process. Also, the deformation and surface characteristics of the cones after firing provide a guide as to the environmental conditions which prevailed during firing, i.e. rate of heating, composition of atmosphere and uniformity of heat application.

One of the primary advantages of pyrometric cones is their sensitivity not only to temperature but to exposure time as well. For example, the temperature at which a cone of a particular composition deforms generally increases as the rate of heating is increased and the exposure time decreased. Since ceramic wares are also sensitive to the combined effects of temperature and time, pyrometric cones have been widely adopted for measuring the amount of heat applied to such wares during firing.

The prior art use of pyrometric cones, however, has not been altogether satisfactory, principally because different users of the cones have employed different techniques for mounting and positioning the cones, with the result that the fusing and deformation characteristics of the cones have not been as uniform as desired. For example, some ceramic manufacturers have mounted the cones in clay plaques of varying compositions and incident to such mounting have positioned the cones in various attitudes, i.e. various heights and inclinations. Other users of pyrometric cones have mounted the cones in preformed clay plaques having sockets of various sizes and configurations therein into which the cones are adapted to be inserted and frictionally held by a wedging action. These constitute two of the more satisfactory prior art cone mounting and positioning techniques. However, these and other less satisfactory mounting and positioning techniques have resulted in wide variations in the performance of the cones.

Uniformity of cone performance requires that the cones be positioned consistently in the same attitude and that the supporting plaque, including the material from which the plaque is made, not affect cone fusing and deformation. It is evident that lack of uniformity in the attitude at which the cones are disposed will induce variations in cone deformation. Moreover, the shrinkage characteristics of the materials from which the cones and supporting plaque are made must be compatible if erratic cone behavior is to be avoided.

SUMMARY OF THE INVENTION

The present invention overcomes the above-mentioned problems associated with the use of pyrometric cones by providing a heat treatment measuring system having means for positioning pyrometric cones in a uniform predetermined attitude, which means do not affect the fusing and deformation characteristics of the cones.

Generally described, the heat treatment measuring system of the invention comprises: at least one pyrometric cone; a plaque for supporting said cone, said plaque including a substantially horizontally disposed base and a substantially vertically disposed retaining wall, said wall being integrally affixed to said base and extending upwardly from the upper surface thereof; and means for holding the lower portion of the cone adjacent one side of the retaining wall to position the cone in a predetermined upright attitude so that when the cone is subjected to a predetermined amount of heating it will fuse and the upper portion thereof will bend downwardly, said base extending away from the wall in the direction of cone bending far enough so that as the upper portion of the cone continues to bend downwardly the upper end thereof eventually will engage the upper surface of the base.

With the foregoing in mind it is an object of the present invention to provide a heat treatment measuring system which accurately determines the amount of heat applied to one or more articles during a heat treatment process.

It is a further object of the invention to provide a heat treatment measuring system which gives substantially uniform indications of the amount of heat applied for like heat treatment processes.

It is another object of the invention to provide a heat treatment measuring system having means for accurately and uniformly positioning one or more pyrometric cones in a predetermined attitude.

It is also an object of the invention to provide a heat treatment measuring system which includes a plaque for supporting one or more pyrometric cones and further includes a means for holding the cones on the plaque in a predetermined upright attitude.

It is an additional object of the invention to provide a heat treatment measuring system including a plaque for supporting one or more pyrometric cones which plaque has a base for engaging the upper ends of the cones when the cones fuse and bend downwardly during heating to thus protect the supporting surface on which the system is placed.

These and other objects of the invention will become apparent from a consideration of the following detailed description of three embodiments thereof given in connection with the following drawings.

BRIEF DESCRIPTION OF THE DRAWINGS

FIG. 1 is a perspective view of a first embodiment of the heat treatment measuring system of the invention, showing the configuration of the pyrometric cones of the system before firing;

FIG. 2 is a sectional view taken on line 2—2 of FIG. 1;

FIG. 3 is an elevational view of the embodiment of the invention shown in FIG. 1, showing the configuration of the cones after firing;

FIG. 4 is a perspective view of a second embodiment of the heat treatment measuring system of the invention;

FIG. 5 is an elevational view of the embodiment of the invention shown in FIG. 4;

FIG. 6 is a sectional view taken on line 6—6 of FIG. 5;

FIG. 7 is a perspective view of a third embodiment of the heat treatment measuring system of the invention; and FIG. 8 is a sectional view taken on line 8—8 of FIG. 7.

DESCRIPTION OF THE PREFERRED EMBODIMENTS

Three embodiments of the heat treatment measuring system of the invention are shown in FIGS. 1–3, 4–6, and 7 and 8 of the drawings, respectively. The first embodiment of the invention, shown in FIGS. 1–3, is designated by reference numeral 10. Heat treatment measuring system 10 includes at least one conventional pyrometric cone and preferably includes three such cones 12, 14 and 16. Cones 12, 14 and 16 are formed in the shape of truncated, trigonal pyramids and are composed of different mixtures of ceramic minerals, with cone 14 being more refractory than cone 12 and cone 16 being more refractory than cone 14, as indicated by the conventional cone designations 07, 06 and 05, respectively.

The cones are supported on a plaque 18, which is made from a ceramic material that is more refractory than that from which any of the cones are made for a reason that will become apparent below. Plaque 18 includes a substantially horizontally disposed base 20 having a substantially planar upper surface 22, and a substantially vertically disposed retaining wall 24 having a substantially planar lateral surface 26. As best shown in FIGS. 2 and 3, wall 24 is integrally affixed to upper surface 22, with lateral surface 26 being slightly angularly inclined from the vertical direction.

Cones 12, 14 and 16 are spaced apart on plaque 18 and are positioned in a predetermined upright attitude so that when the cones are subjected to predetermined amounts of heating they will fuse and deform by gradually bending downwardly under the influence of gravity. To facilitate positioning of the cones, each cone includes at least one substantially planar lateral surface 28 and a substantially planar bottom surface 30. Surfaces 28 and 30 are adapted to be disposed adjacent lateral surface 26 of wall 24 and upper surface 22 of base 20, respectively. When the cones are so disposed, they will be positioned in an upright attitude extending above wall 24 so that when they are subjected to heating the upper portions thereof will bend downwardly over wall 24, as shown in FIG. 3 for cones 12 and 14.

System 10 also includes a means for holding the lower portions of the cones adjacent the side of wall 24 defined by lateral surface 26 so that the cones will be properly positioned as described above. Such a means comprises an adhesive which is interposed between the adjacent surfaces of the cones and the plaque. The adhesive may be a coating 32 of suitable ceramic cement applied to the lower portion of each cone by dipping the cone in the cement. If desired, the cement coating may be applied only to lateral and bottom surfaces 28 and 30 of each cone which are adapted to be positioned adjacent lateral surface 26 of wall 24 and upper surface 22 of base 20, respectively. Alternatively, the adhesive may be interposed between only one of the two pairs of adjacent cone and plaque surfaces.

Care should be exercised in selecting the composition of the cement used for coating 32 so that during a heat treatment process, such as the firing of ceramics in a kiln, shrinkage of the coating will be compatible with shrinkage of the cones.

System 10 additionally may include a means for ascertaining the amount of cone bending. Such a means comprises a planar gauge 34 which may be made of sheet metal, and which is adapted to be removably placed on plaque 18 adjacent the cones after firing. To facilitate the proper placement of gauge 34 on the plaque, the gauge is adapted to register with two surfaces of the plaque; such as upper surface 20 of base 22 and lateral surface 36 of wall 24, the latter defining the side of wall 24 opposite the side defined by lateral surface 26. As shown in FIG. 3, appropriate scales, such as degree and "o'clock" scales, are marked on the face of gauge 34 for measuring the amount of deflection of the upper ends of the cones.

When the cones fuse and deform normally, they will bend over wall 24 and extend outwardly therefrom in a direction generally perpendicular to lateral surface 36, as shown in FIG. 3. This pattern of cone bending ensures that the cones will not overlap each other, thereby permitting gauge 34 to be placed next to any one of the cones for measuring the amount of bending of that cone.

To use heat treatment measuring system 10, cones 12, 14 and 16 and plaque 18 are placed in the environment of a heat treatment process, such as within a kiln during the firing of ceramics therein. As the temperature and time of exposure increase, i.e. the amount of heat increases, cone 12, the least refractory of the three cones, gradually fuses and begins to bend over wall 24. Continued firing results in the similar bending of cones 14 and 16, with cone 16, the most refractory of the three cones, being the last cone to fuse and deform.

Generally the cones are chosen so that when the upper end of the center cone, cone 14, has deflected to the 90° or six o'clock position, as seen in FIG. 3, the firing is completed. This cone is generally referred to as the "firing" cone since it indicates when the firing is complete.

Of the other two cones the one which is composed of a lesser refractory material, such as cone 12, is referred to as the "guide" cone. The guide cone signals the approach of the end of firing and cautions the ceramist to begin watching for bending of the firing cone.

The other of the three cones is composed of the most refractory material, such as cone 16, and is known as the "guard" cone. The guard cone indicates whether the amount of heat applied during firing exceeded that desired. For a normal firing, the guard cone may not show any sign of deformation.

The configurations of the cones as shown in FIG. 3 are typical postfiring configurations. Thus, cone 12, the guide cone, has deformed well beyond the 90° or six o'clock position, whereas cone 14, the firing cone, has deformed only slightly past that position, and cone 16, the guard cone, shows no sign of deformation.

Frequently during a ceramic ware firing process performed in a kiln, pyrometric cones are placed in several locations within the kiln for measuring heat distribution. Heat treatment measuring system 10 may be ideally employed for this purpose. Thus, one system may be used for controlling the firing of the kiln and other systems may be used for measuring heat distribution within the kiln. The latter systems are not relied on for controlling the firing but rather as records of the heating conditions that existed at various points within the kiln during firing. When systems 10 are employed for this latter purpose any one or all of the cones of a particular system may be deformed during firing. Due to the uniformity of cone behavior achieved by system 10, variations in cone deformation between several like systems placed in different locations in a kiln may reliably be attributed to differences in the heating conditions that existed during firing rather than to non-uniform cone behavior; a problem frequently encountered with the prior art use of cones.

As mentioned above, plaque 18 is made of a material which is more refractory than any of the cones. This precludes the possibility of the plaque fusing and disturbing the behavior of the cones or damaging the kiln shelf or other supporting structure on which the system is placed.

Moreover, base 20 of the plaque extends outwardly in the direction of cone bending far enough to engage the upper ends of those cones which bend over completely, as shown in FIG. 3 with respect to cone 12. This prevents the fused upper portions of the cones from contacting and damaging the supporting structure on which the system is placed during firing.

The second embodiment of the invention, shown in FIGS. 4–6, is designated by reference numeral 40. Heat treatment measuring system 40 may include a single conventional pyrometric cone 42 or a plurality of such cones similar to system 10. Cone 42 has at least one substantially planar lateral surface 41 and a substantially planar bottom surface 43 similar to the configuration of cones 12, 14 and 16.

Cone 42 is supported on a plaque 44 which includes a substantially horizontally disposed base 46 and a substantially vertically disposed retaining wall 48. Base 46 has a substantially planar upper surface 50, and wall 48 has a substantially planar lateral surface 52 which is slightly angularly inclined from the vertical direction.

Cone surfaces 41 and 43 are adapted to be disposed adjacent plaque surfaces 52 and 50, respectively, to position the cone in the proper upright attitude with the upper portion of the cone extending above wall 48. The relationship between cone 42 and plaque 44 of system 40 is thus seen to be similar to the relationship between cones 12, 14 and 16 and plaque 18 of system 10.

The principal difference between systems 10 and 40 resides in the different means employed for holding the pyrometric cones in an upright attitude. In system 10 such means comprises an adhesive interposed between the cones and the plaque. In system 40 such means comprises a deformable lip 54 which is integrally affixed to upper surface 50 of base 46 and which defines a socket that substantially envelops the lower portion of cone 42. Lip 54 conveniently is made of the same material as plaque 44 and is deformed about the lower portion of the cone while such material is in a plastic state.

To assemble system 40, cone 42 first is properly positioned in an upright attitude, with cone surfaces 41 and 43 positioned adjacent plaque surfaces 52 and 50, respectively. Lip 54 is then deformed, as by pinching, until the lip contacts and substantially envelops the lower portion of the cone.

Alternatively, the socket defined by lip 54 may be only slightly larger than the lower portion of cone 42, and the cone held in the socket by an adhesive coating applied to one more of the lower cone portion surfaces.

When using a system having but a single pyrometric cone, such as system 40, the cone is selected to signal the completion of firing when the upper end thereof has deflected a predetermined amount, for example to the 90° or six o'clock position as measured by a gauge similar to gauge 34.

As shown in phantom lines in FIG. 5, base 46 extends outwardly from wall 48 in the direction of cone bending far enough to engage the upper end of the cone should it bend over completely, to thus protect the supporting structure of which the system is placed.

As will be apparent several pyrometric cones could be mounted on a plaque similar to plaque 44 which has a plurality of integral deformable lips, similar to lip 54, for individually enveloping the lower portion of each of the cones.

The third embodiment of the invention, shown in FIGS. 7 and 8, is designated by reference numeral 60. Heat treatment measuring system 60 preferably includes three conventional pyrometric cones 62, 64 and 66, which are similar to cones 12, 14 and 16, respectively. Cones 62, 64 and 66 are supported in the proper upright attitude on a plaque 68 which is generally similar to plaque 18. The relationship between the cones and the plaque of system 60 is thus seen to be similar to the relationship between the cones and plaque of each systems 10 and 40.

The principal difference between system 60 and systems 10 and 40 resides in the different means employed for holding the cones in an upright attitude. In system 60 such means comprises a rib 70 which is integrally affixed to the upper surface of the base of plaque 68 and which extends parallel to the retaining wall of the plaque. Rib 70 is spaced from the retaining wall a distance slightly greater than the width of the lower end of one of the cones so that the lower ends of cones 62, 64 and 66 may be placed between the base of the retaining wall and the rib with the cones spaced apart along the wall as shown in FIG. 7. Each cone is held in the proper upright attitude by the lateral restraining force imposed on its lower end by rib 70. Such force prevents the lower end of each cone from moving laterally outwardly from the base of the retaining wall under the influence of gravity.

One advantage of system 60 over systems 10 and 40 is that plaque 68 may be used for several firings. At the end of each firing the lower ends of the cones are simply removed from between the base of the retaining wall and the rib, and the fired cones replaced with unfired cones.

Conversely, the primary advantage of systems 10 and 40 over system 60 is that the former systems comprise completely preformed, integral units which are ready for immediate use and which require no assembly or adjustment by the user with the attendant possibility of error.

For system 40, and to a lesser extent system 60, care must be exercised to ensure that the shrinkage behavior of the cones is compatible with the shrinkage behavior of the plaque. Moreover, since shrinkage differences present less of a problem for system 10, the cones of that system are not likely to be only loosely held on the plaque and therefore easily lost after firing should the user wish to retain the fired cones as a permanent record.

The principal advantage of system 40 is that it includes one less material than system 10, an adhesive, and thus may be less expensive to make than the latter system.

While the foregoing constitutes a detailed description of three preferred embodiments of the invention, undoubtedly various modifications thereof will occur to those skilled in the art.

We claim:

1. A heat treatment measuring system comprising:
    at least one pyrometric cone;
    a plaque for supporting said cone, said plaque including a substantially horizontally disposed base and a substantially vertically disposed retaining wall, said wall being integrally affixed to said base and extending upwardly from the upper surface thereof;
    means for holding the lower portion of the cone adjacent one side of the retaining wall to position the cone in a predetermined upright attitude extending above the wall so that when the cone is subjected to a predetermined amount of heating it will fuse and the upper portion thereof will bend downwardly over the wall, said base extending away from the wall in the direction of cone bending far enough so that as the upper portion of the cone continues to bend downwardly the upper end thereof eventually will engage the upper surface of the base on the side of the wall opposite the said one side thereof; and
    means for determining the amount of deflection of the upper end of the cone due to said heat-induced bending.

2. A system as recited in claim 1, wherein said holding means comprises an adhesive interposed between the cone and the plaque.

3. A system as recited in claim 1, wherein said holding means comprises a deformable lip integrally affixed to the base and adapted to be deformed about the lower portion of the cone.

4. A system as recited in claim 1, wherein said holding means comprises a lip integrally affixed to the base and defining a socket for substantially enveloping the lower portion of the cone.

5. A system as recited in claim 1, wherein said holding means comprises a rib integrally affixed to the base and extending upwardly from the upper surface thereof, said rib being spaced from the retaining wall on said one side thereof a distance slightly greater than the width of the lower end of the cone so that when the lower end of the cone is positioned between the rib and wall the lower portion of the cone will be held adjacent the wall.

6. A system as recited in claim 1, wherein a plurality of pyrometric cones are positioned in said predetermined upright attitude adjacent the said one side of the retaining wall by said holding means.

7. A system as recited in claim 1, wherein said deflection determining means comprises a gauge adapted to register with the upper surface of the base and the lateral surface which defines the side of the retaining wall opposite the said one side thereof, said gauge having a scale marked thereon for indicating the amount of deflection of the upper end of the cone.

8. A heat treatment measuring system comprising:
at least one pyrometric cone having a substantially planar bottom surface and at least one substantially planar lateral surface;
a plaque for supporting said cone, said plaque including a substantially horizontally disposed base having a substantially planar upper surface and further including a substantially vertically disposed retaining wall having a substantially planar lateral surface, said wall being integrally affixed to said base and extending upwardly from the upper surface thereof with said lateral surface thereof being slightly angularly inclined from the vertical direction;
means for holding the lower portion of the cone adjacent the retaining wall with the bottom surface of the cone adjacent the upper surface of the base and the said one lateral surface of the cone adjacent the said angularly inclined lateral surface of the wall to position the cone in a predetermined upright attitude so that when the cone is subjected to a predetermined amount of heating it will fuse and the upper portion thereof will bend downwardly, said base extending away from the wall in the direction of cone bending far enough so that as the upper portion of the cone continues to bend downwardly the upper end thereof eventually will engage the upper surface of the base; and
means for determining the amount of deflection of the upper end of the cone due to said heat-induced bending.

References Cited

UNITED STATES PATENTS

| | | | |
|---|---|---|---|
| 2,129,912 | 9/1938 | CoVan et al. | 73—358 |
| 2,274,343 | 2/1942 | Orth et al. | 73—358 |

S. CLEMENT SWISHER, Primary Examiner

F. SHOON, Assistant Examiner